United States Patent [19]

Chew et al.

[11] Patent Number: 5,417,389
[45] Date of Patent: May 23, 1995

[54] METHOD OF, AND APPARATUS FOR, DE-ICING AN AIRCRAFT BY INFRARED RADIATION

[75] Inventors: Charles J. Chew, Ellicottville; Timothy P. Seel, Tonawanda, both of N.Y.

[73] Assignee: Radiant Energy Corporation, North York, Canada

[21] Appl. No.: 207,883

[22] Filed: Mar. 7, 1994

Related U.S. Application Data

[63] Continuation of Ser. No. 20,216, Feb. 19, 1993, abandoned.

[51] Int. Cl.[6] .............................................. B64D 15/00
[52] U.S. Cl. ........................... 244/134 R; 126/92 AC; 126/92 B
[58] Field of Search ....................... 244/134 R, 134 C; 134/45, 123; 392/414; 126/92 AC, 92 B, 91 R

[56] References Cited

U.S. PATENT DOCUMENTS

| | | | |
|---|---|---|---|
| 3,023,296 | 2/1962 | Barber | 392/414 |
| 3,194,960 | 7/1965 | Tuttle | 126/92 B |
| 3,330,267 | 7/1967 | Bauer | 126/92 B |
| 3,451,094 | 6/1969 | Kywi | 134/123 |
| 4,378,755 | 4/1983 | Magnusson et al. | 134/123 |
| 4,682,578 | 7/1987 | Schmidt | 126/92 B |
| 5,161,753 | 11/1992 | Vice et al. | 244/134 C |

*Primary Examiner*—William Grant
*Attorney, Agent, or Firm*—Phillips, Lytle, Hitchcock, Blaine & Huber

[57] ABSTRACT

An improved apparatus (11) for emitting infrared radiation of a desired wavelength includes a primary surface (35); a burner (24) for raising the temperature of the primary surface so as to cause the primary surface to emit infrared radiation of a first wavelength; a secondary surface (26) surrounding the primary surface in spaced relation thereto and arranged to be heated by infrared radiation emitted by the first surface and for emitting infrared radiation of a second wavelength toward the object; and an actuator (28) for selectively varying the spacing between the primary and secondary surfaces so that infrared radiation emitted by the secondary surface will be at a desired wavelength and will be focused; whereby the apparatus will emit infrared radiation of a desired wavelength toward the object. The improved apparatus may be used in a method of de-icing a portion of an aircraft, which includes the steps of: providing a structure (10) having an infrared heater (23); moving an aircraft relative to the structure to a position adjacent the heater; operating the heater so as to emit radiation toward the object; and controlling the wavelength of radiation emitted by the heater; thereby to melt snow and ice from the aircraft portion.

13 Claims, 3 Drawing Sheets

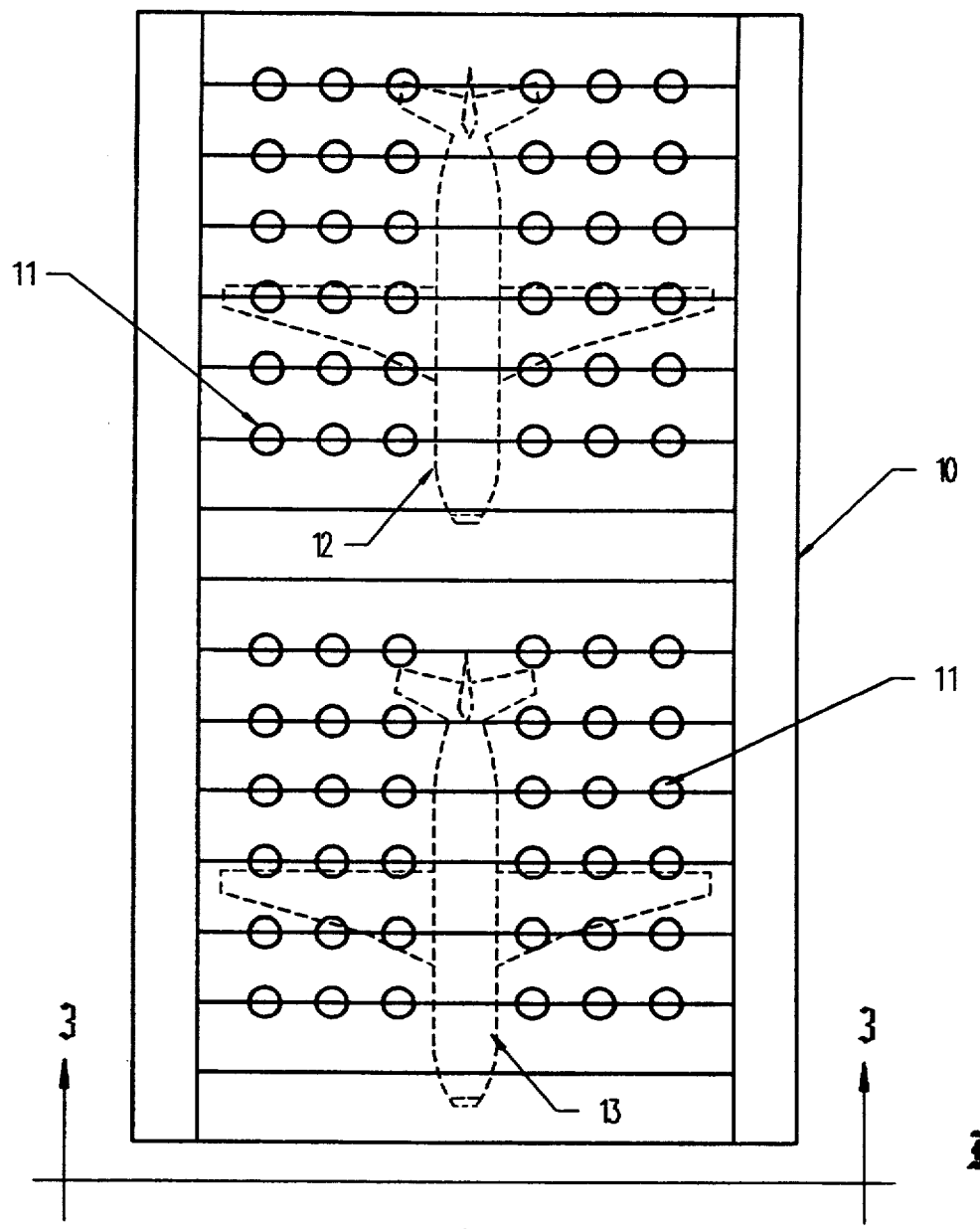
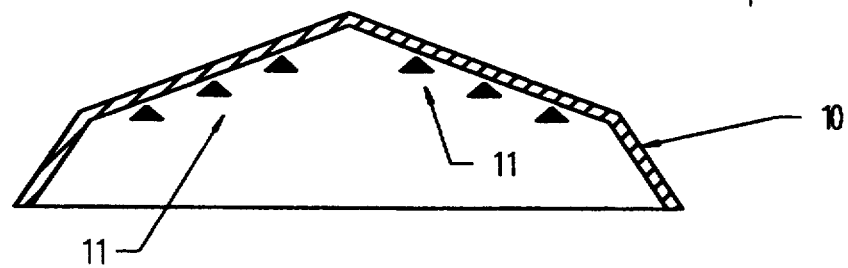
Fig. 2
Fig. 3

METHOD OF, AND APPARATUS FOR, DE-ICING AN AIRCRAFT BY INFRARED RADIATION

This is a continuation of copending application Ser. No. 08/020,216, filed on Feb. 19, 1993, now abandoned.

TECHNICAL FIELD

This invention relates generally to the field of methods of, and apparatae for, de-icing portions of an aircraft on the ground, and, more particularly, to an improved method and apparatus for de-icing an aircraft by means of a focusable, variable-wavelength infrared energy source.

BACKGROUND ART

It is sometimes necessary to de-ice certain portions of an aircraft prior to take-off.

Existing technology in common use today involves the spraying of large quantities of chemicals onto the working surfaces (e.g., wings, rudder, ailerons, flaps, stabilizers, etc.) of the aircraft. These chemicals are normally applied just prior to the aircraft's departure from the boarding gate. Federal requirements dictate a maximum time interval between application of the de-icing spray and take-off. This time interval is usually on the order of from about fifteen to about thirty minutes. Unfortunately, with the traffic jams common at some major airports, the departure interval is often extended beyond that recommended. If this occurs, the plane must sometimes be de-iced a second time before take-off. The desire to maintain established schedules and to minimize costs makes this second step undesirable, even if needed. The presence of ice and snow on airfoil surfaces during take-off has been indicated as the probable cause of many crashes.

The foregoing, when considered along with soon-to-be-enforced stricter environmental regulations concerning the handling, storage, use and collection of over-sprayed de-icing chemicals, establishes a present need to find a better way to remove accumulations of ice and snow in preparation for take-off.

Two types of de-icing chemicals are in use today. The United States typically uses Type I, which is a mixture of ethylene glycol or propylene glycol and water. This mixture is heated to about 140°-180° F., and then sprayed on the aircraft. European countries commonly use Type II. This is a blend of glycol and a thickening agent, which creates a thicker jelly-like substance. The Type It mixture does hold longer, but can affect take-off of small aircraft. Hence, it is not recommended for use on aircraft having rotation speeds of less than about 85 knots.

It has been proposed that all U.S. airport de-icing equipment be modified to use European Type II chemicals. However this has shortcomings. Upon information and belief, propylene glycol is considered safe to humans by the Food and Drug Administration, but is harmful to the environment. While not currently regulated by OSHA, it has been reported to cause skin irritation, and is listed as a hazardous air pollutant in the Clean Air Act Amendments of 1990. Ethylene glycol is poisonous to humans, and is regulated by OSHA because of a risk of throat and respiratory tract irritation. The Water Quality Act of 1987 prohibits the discharge of polluted water into navigable waters and regulations have been promulgated to prevent airports from dumping or discharging glycol-contaminated storm water run-off into rivers and sewer systems.

Accordingly, there is believed to be a clear and present need for an improved method of, and apparatus for, de-icing portions of an aircraft without the need of such de-icing chemicals.

DISCLOSURE OF THE INVENTION

This invention provides an improved method of, and apparatus for, de-icing portions of an aircraft without the need of such hazardous chemicals.

In one aspect, the invention broadly provides an improved method of deicing a portion of an aircraft, comprising the steps of: providing a structure having an infrared heater; moving an aircraft relative to said structure to a position adjacent said heater; operating said heater so as to emit infrared radiation toward said aircraft portion; and controlling the wavelength of the radiation emitted by said heater; thereby to melt ice and snow from said aircraft portion.

In another aspect, the invention provides an improved apparatus for de-icing portions of an aircraft by a controllable radiant energy technique. The improved apparatus is arranged to emit infrared radiation of a desired wavelength toward an aircraft having a undesired substance (e.g., ice, snow, water) thereon. The improved apparatus broadly comprises: a primary surface (25); a heater or burner (24) for raising the temperature of the primary surface so as to cause the primary surface to emit infrared radiation of a first wavelength; a secondary surface (26) surrounding the primary surface in spaced relation thereto and arranged to be heated by infrared radiation emitted by the first surface and for emitting infrared radiation of a second wavelength toward the aircraft; and an actuator (28) for selectively varying the spacing between the primary and secondary surfaces so that the wavelength of the infrared radiation emitted by the secondary surface will be at the wavelength determined by the design relationship between the primary and secondary surfaces; whereby the apparatus will emit infrared radiation of a desired wavelength toward the aircraft. In the preferred embodiment, the wavelength of the radiation emitted toward the aircraft is the wavelength of maximum absorptivity of the substance-to-be-removed.

Accordingly, the general object of the invention is to provide an improved method of de-icing portions of an aircraft prior to take-off.

Another object is to provide improved apparatus for de-icing portions of an aircraft prior to take-off.

Another object is to provide an improved method of, and apparatus for, de-icing portions of an aircraft by a radiant infrared technique, and by avoiding the use of potentially hazardous de-icing chemical in common use today.

Still another object is to provide an improved method of, and apparatus for, heating a distant object by means of emitted infrared radiation.

These and other objects will become apparent from the foregoing and ongoing written specification, the drawings, and the appended claims.

BRIEF DESCRIPTION OF THE DRAWINGS

FIG. 2 is a top plan view of a drive-through structure containing a plurality of infrared heaters, with the roof of the structure removed, and showing the array of heaters relative to two aircraft positions.

FIG. 3 is the front elevational view of the drive-through structure shown in FIG. 2.

DESCRIPTION OF THE PREFERRED EMBODIMENT(S)

Figure 1:
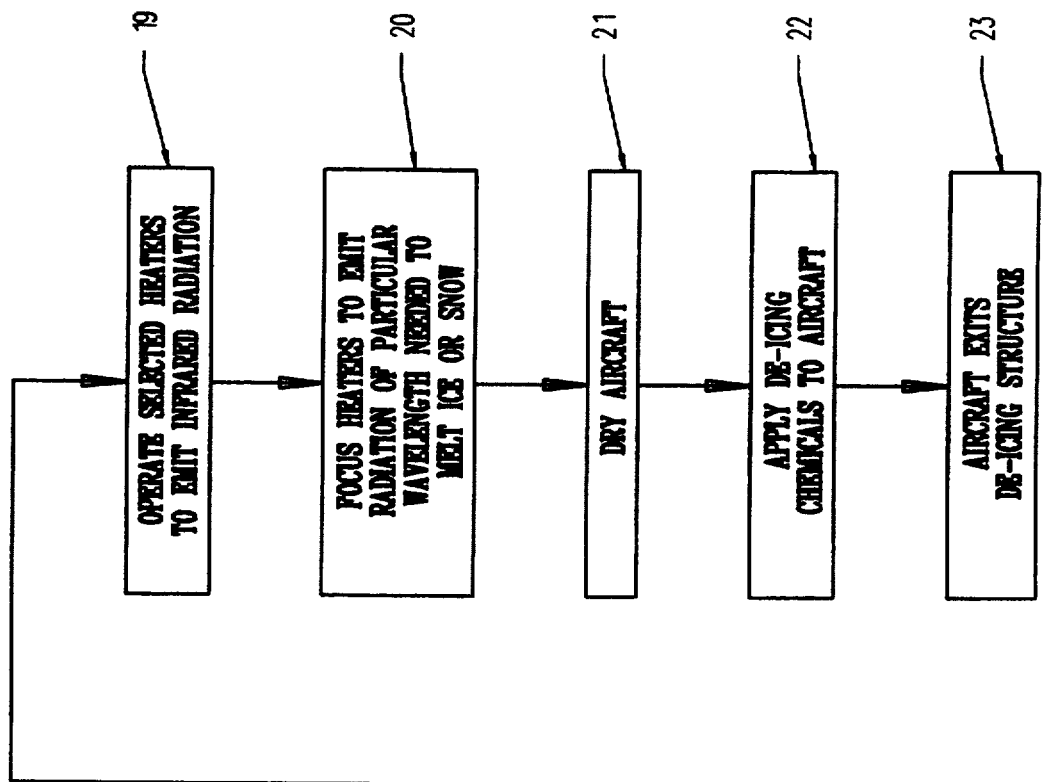
FIG. 1 is a flow chart of a preferred sequence of manipulative steps involved in practicing the improved method to de-ice an aircraft.
Figure 1:
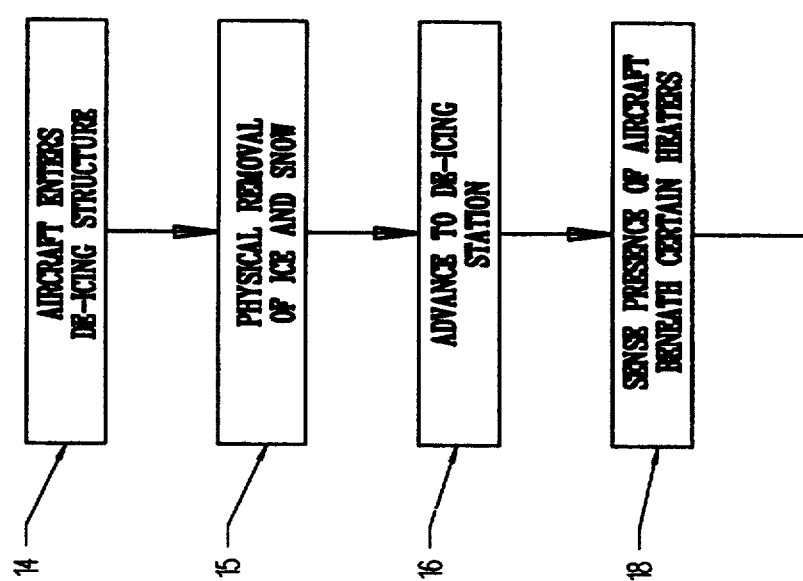

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

Turning now to the drawings, the present invention provides an improved method of, and apparatus for, heating a substance by means of emitted infrared radiation. In one application, the method and apparatus are used to de-ice an aircraft.

Referring now to FIGS. 1-3, an aircraft to be de-iced is driven through an open-ended structure, generally indicated at 10, having a plurality of overhead infrared heaters, severally indicated at 11 arranged in a rectangular array. In FIG. 2, two aircraft positions are indicated within the structure. The first is indicated at 12, and the second is indicated at 13. These two positions have been omitted from FIG. 3 in the interest of clarity.

As best shown in FIG. 1, the aircraft first enters the drive-through de-icing structure 10, as indicated at block 14 in FIG. 1. Upon entry to that structure and/or when in the position of aircraft 12, as much ice, snow and/or water as can be removed are physically removed. This is indicated in block 15 in FIG. 1. The means for physical removal may include an air curtain, or the like. After as much of the adherent substance as can be physically removed has been removed, the aircraft then advances forwardly toward the second station, indicated by aircraft position 13. This step is indicated in block 16 of FIG. 1. Assuming that the type of aircraft is known, selected heaters are then operated to emit radiation. The particular heaters which may be operated may be determined either from the known type of the aircraft (i.e., having a known shape), or by proximity sensors (not shown) acting downwardly and operatively arranged to sense portions of the aircraft therebeneath. This latter step is indicated by block 18 in FIG. 1. In any event, only those heaters which are aimed downwardly at portions of the aircraft are operated. Those heaters which are operated are selectively focused to emit radiation to maximize energy of the surface of the aircraft needed to melt ice or snow. This is indicated by blocks 19 and 20 in FIG. 1. The various heaters are operated so as to emit radiation toward the aircraft at a wavelength which coincides with the wavelength of the maximum absorptivity of the substance to be removed. In any event, after the adherent substances have been melted, the aircraft is then dried, as indicated in block 21 of FIG. 1. The aircraft may be dried under the influence of heat with or without an accompanying air curtain. Thereafter, de-icing chemicals are applied to the now-dry aircraft (as indicated at 22 in FIG. 1), and the aircraft then exits the de-icing structure (as indicated at 23 of FIG. 1), taxis to the runway, and is ready for take-off.

Figure 4:
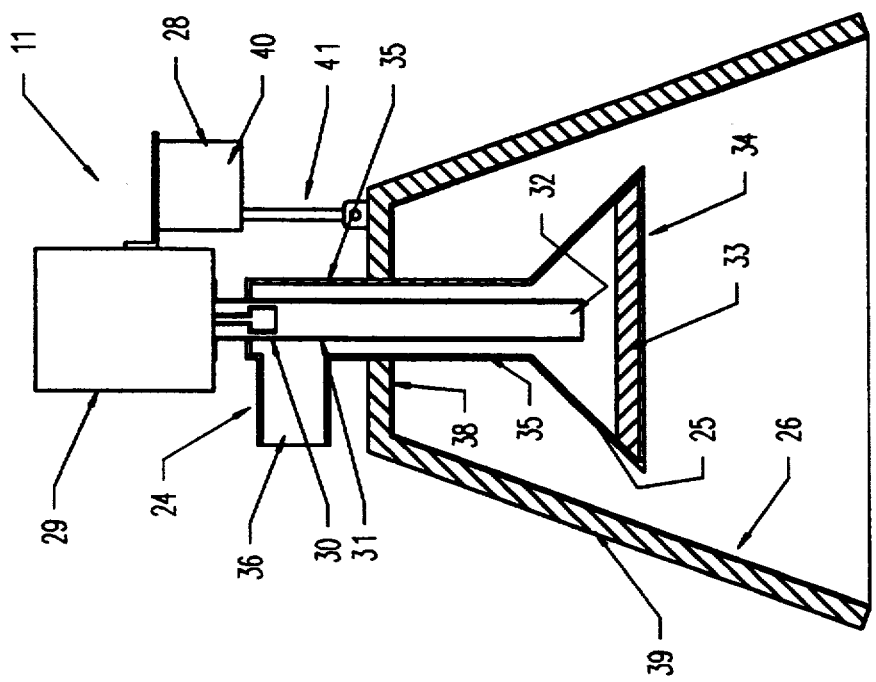
FIG. 4 is a fragmentary vertical sectional view of one of the heaters, showing the surrounding skirt as being in one position relative to the burner.

FIG. 4 is a fragmentary vertical sectional view of one of the heaters shown in FIGS. 2 and 3. This heater apparatus, generally indicated at 11, broadly includes a burner 24 operatively arranged to heat a frusto-conical primary surface 25, a secondary surface 26 surrounding the primary surface in spaced relation thereto, and an actuator 28 operatively arranged to selectively vary the spacing between the primary and secondary surfaces. The heater or burner 24 is shown is including a control housing 29 having a downwardly-directed burner head 30 arranged concentrically within an elongated vertical tube 31. Thus, a flame emitted by burner 24 will travel down the tube and be discharged through the lower open end 32 thereof toward a dish-like layer of insulation 33 arranged on the upper side of a wall 34. The heat of combustion will then heat primary surface 25, and will flow upwardly through the annular space between inner tube 31 and outer tube 35, and be vented through a lateral opening 36. The secondary surface 26 is shown as being frusto-conical in shape, and has a downwardly-facing annular horizontal portion 38 at its upper end. The entire secondary surface 26,38 is insulated, as indicated at 39. Actuator 28 has a body or housing 40 mounted on the control housing, and has a rod portion 41 connected to the insulated secondary surface. Actuator 28 may be selectively operated to move rod 41 either upwardly or downwardly, as desired. Such operation of the actuator effectively varies the spacing between the primary and secondary surfaces, and changes the output concentration and focal distance.

In operation, a conventional gaseous fuel is supplied to the burner, and is ignited. The burner then issues a downwardly-directed flame against insulation 33. The flame then rolls reversely and rises upwardly to heat primary surface 25. The heat of combustion travels upwardly through the annular chamber between the inner and outer tubes 31,35, and is then vented via lateral opening 36. Thus, the heater raises the temperature of the primary surface 25, and causes it to emit infrared radiation. The temperature of the primary surface may be on the order of 2,000° F. The infrared radiation emitted by the primary surface is directed toward the secondary surface and raises its temperature. The temperature of the secondary surface 26 is, therefore, less than that of the primary surface, and may typically be in the range of about 900°-1,000° F. The secondary surface then emits infrared radiation of a desired wavelength downwardly toward the aircraft therebeneath. Thus, the primary surface radiates infrared energy to heat the secondary surface, which in turn emits radiation toward the object. The spacing between the primary and secondary surfaces determines the temperature of the secondary surface, for a constant-temperature primary surface.

Figure 5:
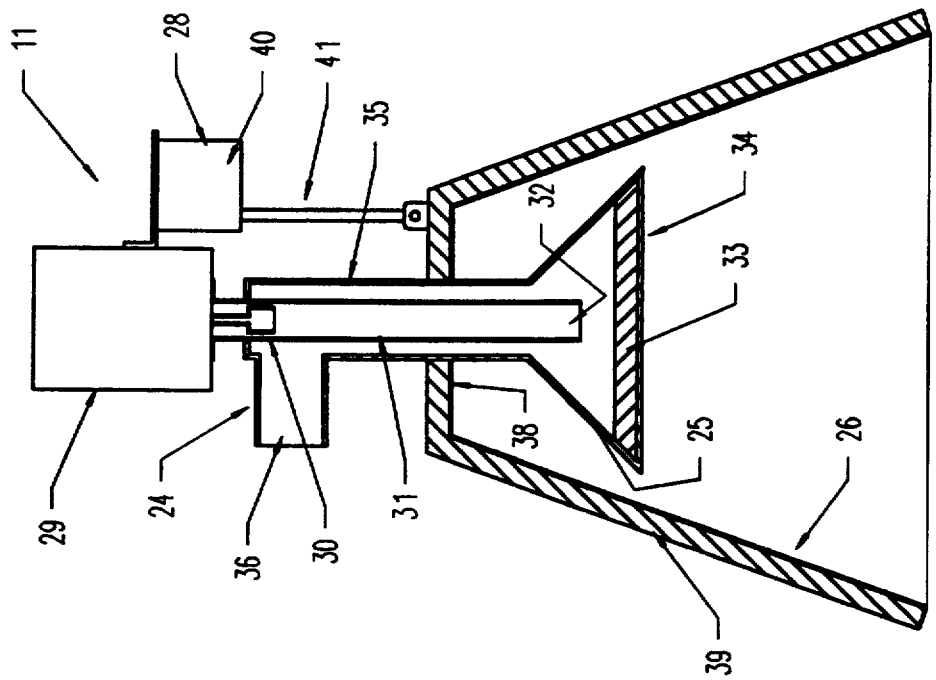
FIG. 5 is a fragmentary vertical sectional view of one of the heaters, showing the surrounding skirt in another position relative to the burner.

One unique feature of the invention is that the actuator 28 is selectively operated so as to vary the spacing between the primary and secondary surfaces so that the secondary surface will emit infrared radiation of a desired energy pattern. In the preferred embodiment, this desired wavelength is the wavelength of the maximum absorptivity of the material-to-be-removed (e.g., ice, snow or water). Thus, the apparatus may be tuned to emit radiation at the desired wavelength by selectively varying the design between the primary and secondary surfaces. FIG. 4 depicts the depending cupshaped skirt having the secondary surface as being in one position relative to the burner, and FIG. 5 simply depicts such skirt as being in a lowered position relative to the body. This is simply to illustrate the difference in spacing between the primary and secondary surfaces.

MODIFICATIONS

The present invention contemplates that many changes and modifications may be made. While it is presently preferred to use the apparatus to selectively de-ice aircraft, the person skilled in this art will readily appreciate that the improved method and apparatus could, alternatively, be used to simply heat an object. Accordingly, this alternative use should not be excluded from the scope of the claims unless an express limitation to the effect appears therein.

The improved method may include a greater or lesser number of steps than those shown in FIG. 1. Similarly, the structure of the apparatus may differ from that shown in FIGS. 4 and 5. For example, the primary surface 25 need not be frusto-conical, but could be convex or arcuate, as desired. Similarly, the outer tube 35 could be tapered upwardly so as to provide a progressive flow restriction, all with the concomitant advantage of also heating outer tube 35. Similarly, the inverted cup-shaped skirt which forms the body of the secondary surface need not be of the particular form and shape shown. In other words, the secondary surface could be arcuate, parabolic, or some other concave surface, as desired.

Therefore, while preferred forms of the improved method and apparatus have been shown and described, and several modifications thereof discussed, persons skilled in this art will readily appreciate the various additional changes and modifications may be made without departing from the spirit of the invention, as defined and differentiated by the following claims.

What is claimed is:

1. A method of de-icing a portion of an object, comprising the steps of:
    providing a structure having a source of infrared radiation, said source including a first means for emitting infrared radiation of a first wavelength and a second means spaced from said first means and heated by the infrared radiation emitted by said first means for emitting infrared radiation of a second wavelength;
    moving an object relative to said structure to a position adjacent said source of infrared radiation;
    operating said source of infrared radiation so as to emit infrared radiation of said second wavelength toward the portion of said object to be de-iced; and
    controlling the second wavelength of the radiation emitted by said source of infrared radiation by adjusting the spacing between the first means and the second means, thus controlling the emitted infrared radiation distribution so as to maximize the absorption of such radiation by any snow and ice to be melted from said object portion;
    thereby to provide radiant infrared energy at a high output and at a desired wavelength to melt the snow and ice from said object portion.

2. The method as set forth in claim 1, and further comprising the additional step of: physically removing accumulations or ice and snow from said object portion prior to the step of operating said source of infrared radiation.

3. The method as set forth in claim 1, and further comprising the additional step of: drying said object portion after ice and snow have been melted therefrom.

4. The method as set forth in claim 3, and further comprising the additional step of: applying an anti-icing chemical to said object portion after snow and ice have been melted therefrom.

5. The method as set forth in claim 1, and further comprising the additional step of: applying an anti-icing chemical to said object portion after snow and ice have been melted therefrom.

6. The method as set forth in claim 1, and further comprising the additional step of: focusing such emitted radiation distribution said object portion.

7. The method as set forth in claim 1, wherein said source of infrared radiation further comprises:
    said first means comprising a primary surface;
    a heater for raising the temperature of said primary surface so as to cause said primary surface to emit said infrared radiation of said first wavelength;
    said second means comprising a secondary surface surrounding said primary surface in spaced relation thereto and arranged to be heated by said infrared radiation emitted by said primary surface for emitting said infrared radiation at said second wavelength toward said object; and
    an actuator for selectively varying the spacing between said primary and secondary surfaces so that said infrared radiation emitted by said secondary surface will be at said desired wavelength and will be focused.

8. A method of heating a portion of an object, comprising the steps of:
    providing a structure having an infrared heater, a first means for emitting infrared radiation of a first wavelength, and a second means spaced from said first means and heated by the infrared radiation emitted by said first means for emitting infrared radiation of a second wavelength;
    moving an object relative to said structure to a position adjacent to said heater;
    operating said heater so as to emit infrared radiation of said second wavelength toward the portion of said object to be heated; and
    controlling the second wavelength of the radiation emitted by said heater by adjusting the spacing between the first means and the second means, thus controlling the emitted infrared radiation distribution so as to maximize the absorption of such radiation by said object portion;
    thereby to heat said object portion.

9. Apparatus for emitting infrared radiation of a desired wavelength toward an object, comprising:
    a primary surface;

a heater for raising the temperature of said primary surface so as to cause said primary surface to emit infrared radiation of a first wavelength;

a secondary surface surrounding said primary surface in spaced relation thereto and arranged to be heated by infrared radiation emitted by said primary surface and for emitting infrared radiation of a second wavelength toward said object; and an actuator for selectively varying the spacing between said primary and secondary surfaces so that infrared radiation emitted by said secondary surface will be at a desired wavelength and will be focused;

whereby said apparatus will emit infrared radiation of a desired wavelength toward said object.

10. The apparatus as set forth in claim 9 wherein said primary surface is frusto-conical, and faces away from said object.

11. The apparatus as set forth in claim 10 wherein a portion of said secondary surface is frusto-conical, and faces toward said object.

12. The apparatus as set forth in claim 9 wherein said heater has an elongated tube, and wherein said secondary surface is slidably mounted on said tube.

13. The apparatus as set forth in claim 9 wherein said object is an aircraft having a substance thereon, and wherein the wavelength of infrared radiation emitted by said secondary surface is the wavelength of maximum absorptivity of said substance.

* * * * *